United States Patent Office 2,965,681
Patented Dec. 20, 1960

2,965,681

OXIDATIVE COUPLING OF PARA-NITROTOLUENE

Harry A. Stansbury, Jr., South Charleston, and William R. Proops, Charleston, W. Va., assignors to Union Carbide Corporation, a corporation of New York No Drawing. Filed Mar. 4, 1959, Ser. No. 797,012

8 Claims. (Cl. 260—645)

This invention relates to the production of 4,4'-dinitrobibenzyl. More particularly, this invention relates to an improved process for oxidatively coupling para-nitrotoluene.

4,4'-bibenzyldiisocyanate is a valuable starting material for the production of polyurethane elastomers which have exceptionally desirable properties such as high tensile strength. A convenient method for preparing 4,4'-bibenzyldiisocyanate is by the phosgenation of 4,4'-diaminobibenzyl. This latter compound, in turn, is readily prepared by reduction of 4,4'-dinitrobibenzyl with hydrogen.

The feasibility of commercially preparing 4,4'-bibenzyldiisocyanate from 4,4'-dinitrobibenzyl is mainly dependent on the availability and cost of the 4,4'-dinitrobibenzyl starting material. One of the potentially most attractive synthesis methods for producing 4,4'-dinitrobibenzyl is by the oxidative coupling of para-nitrotoluene. Several variations are described in the literature for coupling para-nitrotoluene in the presence of molecular oxygen. One of the most convenient of these methods involves the oxidative coupling of para-nitrotoluene in the presence of oxygen and methanolic potassium hydroxide. However, this method is not amenable to commercial application because the production ratio is only about 5 grams of product per liter of solution per hour, and only about 0.15 gram of product is produced per gram of potassium hydroxide employed.

Accordingly, it is a main object of this invention to provide an improved oxidative method for coupling para-nitrotoluene which is practicable for commercial application.

Other objects and advantages of this invention will become apparent from the accompanying description and disclosure.

One or more objects of this invention are accomplished by a process which comprises treating para-nitrotoluene with oxygen in the presence of between about 0.005 part and 3 parts by weight of an alkali metal hydroxide, between about 0.1 part and 10 parts by weight of methanol and between about 1 part and 20 parts by weight of an organic solvent selected from the group consisting of amines and ethers having a solubility of at least 6 percent by weight in water at a temperature of 20° C., per part by weight of said para-nitrotoluene, at a reaction temperature of between about —10° C. and 50° C. and a pressure of between about 0.1 and 10 atmospheres and separating a product comprising substantially 4,4'-dinitrobibenzyl.

The oxygen can be introduced into the reaction medium as pure oxygen or it can be introduced in an oxygen-containing gas stream such as air. In general, oxygen at atmospheric pressure will perform at a similar oxidation rate as air employed at 100 to 150 p.s.i.g. pressure.

The alkali metal hydroxide used in the process is preferably sodium hydroxide or potassium hydroxide employed in a quantity between 0.005 and 3.0 parts by weight per part of para-nitrotoluene. This is much less alkali than is required in prior art methods.

The organic solvents selected from amines and ethers having a solubility of at least 6 percent by weight in water at a temperature of 20° C. are preferably those having a molecular weight between about 60 and 200. The solvents must not contain groups which react under alkaline conditions, e.g., groups such as aldehyde, acid, ester, ketone, halogen and other similar groups. The solvents are preferably limited to compounds containing oxygen and nitrogen atoms exclusively in the form of ether and amine groups, respectively. Illustrative of suitable solvents are pyridine, picolines, ethylenediamine, diethylenetriamine, triethylamine, diethyl ether, dioxane, diethyl Carbitol, diethyl Cellosolve, tetrahydrofuran, morpholine and the like.

The amounts of organic solvent and methanol employed in the process can vary over wide weight ranges as indicated above, but sufficient solvent and methanol should always be used to allow sufficient agitation of the reaction mixture and permit proper contact between the alkali, para-nitrotoluene and oxygen.

The oxidation process is conducted at a temperature in the range between about —10° C. and 50° C. and a pressure between about 0.1 and 10 atmospheres, with the preferred conditions being a temperature in the range between 5° C. and 15° C. and a pressure between 1.0 and 5.0 atmospheres.

Particularly outstanding results are obtained when methanolic potassium hydroxide or methanolic sodium hydroxide is employed in conjunction with ethylenediamine solvent. Ethylenediamine permits the use of low-cost sodium hydroxide in the process whereas less satisfactory results are obtained when sodium hydroxide is used in the process with other solvents.

The reaction product recovered from the process of this invention consists substantially of 4,4'-dinitrobibenzyl. A minor amount of 4,4'-dinitrostilbene (e.g., an amount between 4.0 and 40.0 percent by weight of the product) is produced in the process, but this by-product is easily separated from the 4,4'-dinitrobibenzyl by a method described more fully hereinafter.

The process has special advantage when 4,4'-diaminobibenzyl is to be synthesized from para-nitrotoluene. Both the 4,4'-dinitrobibenzyl and 4,4'-dinitrostilbene produced by the oxidative coupling of para-nitrotoluene in the process of this invention can be reduced with hydrogen to the same 4,4'-diaminobibenzyl product. It is advantageous in this two-step synthesis to suppress the production of 4,4'-dinitrostilbene to a minimum level because it is more difficult to hydrogenate 4,4'-dinitrostilbene than it is to hydrogenate 4,4'-dinitrobibenzyl.

The following examples will serve to illustrate specific embodiments of the invention.

The crude reaction products in the examples were treated with hot benzene to separate the material into two fractions. The product that dissolved in the hot benzene was recovered separately as crystallized 4,4'-dinitrobibenzyl. The product which was insoluble in the hot benzene was isolated, and analysis indicated that the composition was about 55 to 65 percent 4,4'-dinitrostilbene and 35 to 45 percent 4,4'-dinitrobibenzyl. For convenience, the yields of 4,4'-dinitrostilbene disclosed in the examples are based on the assumption that all material insoluble in hot benzene was 4,4'-dinitrostilbene.

*Example 1*

A solution of 137 grams (1.0 mole) of para-nitrotoluene in 400 grams of 85 percent ethylenediamine was added over a one-hour period to a vigorously stirred solution of 500 grams of 20 percent methanolic sodium hydroxide. An excess of oxygen was passed through the reaction mixture at all times and the temperature was maintained in the range between 7° C. and 10° C. After an additional one hour at this temperature, absorption of oxygen appeared complete and 800 milliliters of water were added. A solid precipitate which formed in the mixture was filtered, washed with methanol and dried. This crude product (120 grams) corresponded to an 88 percent yield, and a production ratio of 57 grams per liter per hour. The crude product was recrystallized from benzene to afford 102 grams (75 percent yield) of pure 4,4'-dinitrobibenzyl (M.P. 179°–180° C.). 4,4'-dinitrostilbene (7 grams, 5 percent yield) was recovered as material insoluble in hot benzene.

*Example 2*

A solution of 137 grams (1.0 mole) of para-nitrotoluene dissolved in 400 grams of 85 percent ethylenediamine was added over a one-hour period to a stirred solution of 250 grams of 20 percent methanolic sodium hydroxide and 200 grams of 85 percent ethylenediamine. An excess of oxygen was passed through the reaction mixture at all times and the temperature was maintained at 7° C. to 10° C. After an additional one hour at this temperature, water was added and the crude product (125 grams, 92 percent yield) which precipitated was filtered, washed with methanol and dried. The production ratio was 60 grams per liter per hour. The crude product was treated with hot benzene, and 80 grams of 4,4'-dinitrobibenzyl (59 percent yield) and 35 grams of 4,4'-dinitrostilbene (26 percent yield) were recovered as separate fractions.

*Example 3*

In the same manner as the previous examples, 137 grams of para-nitrotoluene dissolved in 475 grams of 85 percent ethylenediamine was added over a period of one hour to a stirred mixture of 125 grams of 20 percent methanolic sodium hydroxide and 325 grams of 85 percent ethylenediamine while oxygen was passed into the mixture at 7–10° C. The reaction temperature was maintained at 7° C. to 10° C. while the oxidation was continued for an additional hour. The crude product was precipitated with water, filtered, washed with methanol and dried (112 grams, 82 percent yield). The production ratio was 50 grams per liter per hour. The crude product was treated with benzene and 55 grams of 4,4'-dinitrobibenzyl (40 percent yield) and 46 grams of 4,4'-dinitrostilbene (34 percent yield) were recovered.

*Example 4*

One hundred and thirty-seven grams of para-nitrotoluene dissolved in 400 grams of 85 percent ethylenediamine were added over a period of one hour to a stirred mixture of 62.5 grams of 20 percent methanolic sodium hydroxide at a temperature of 7° C. to 10° C. while oxygen was passed through the mixture. After an additional hour of oxidation at this temperature, a crude product was precipitated with water, filtered, washed with methanol and dried (88 grams, 65 percent yield). The production ratio was 42 grams per liter per hour. The crude product was treated with benzene and 47 grams of 4,4'-dinitrobibenzyl (35 percent yield) and 22 grams of 4,4'-dinitrostilbene (16 percent yield) were recovered.

*Example 5*

This example illustrates the oxidative coupling of para-nitrotoluene performed without the benefit of one of the solvents of this invention.

Solid para-nitrotoluene (137 grams) was added all at once to a stirred mixture of 500 grams of 20 percent methanolic sodium hydroxide. The reaction mixture was maintained for two hours at 7° C. to 10° C. and for an additional two hours at 25° C. to 30° C. while oxygen was passed through the mixture. A crude product (24 grams, 18 percent yield) was recovered as in the previous examples. The production ratio was only 8 grams per liter per hour. The crude product was treated with benzene and 22 grams of 4,4'-dinitrobibenzyl (16 percent yield) and less than one gram of 4,4'-dinitrostilbene were recovered.

*Example 6*

In a manner similar to the previous examples, a solution of 137 grams of para-nitrotoluene in 300 grams of 98 percent ethylendiamine was fed in 1 hour to 465 grams of 28 percent methanolic potassium hydroxide while stirring at 5–10° C. and passing excess oxygen into the mixture. The oxidation was continued for one hour at a temperature of 5° C. to 10° C. A crude reaction product (122 grams, 90 percent yield) was recovered as in previous examples. The production ratio was 64 grams per liter per hour. The crude product was treated with hot benzene, and 101 grams of 4,4'-dinitrobibenzyl (74 percent yield) and 13 grams of 4,4'-dinitrostilbene (10 percent yield) were recovered.

*Example 7*

A mixture of para-nitrotoluene (137 grams) and 33 percent methanolic potassium hydroxide (400 grams) was reacted with oxygen for two hours at a temperature of 7° C. to 10° C. A crude product (52 grams, only 38 percent yield) was recovered as in previous examples. The production ratio was 52 grams per liter per hour. The crude product was treated with hot benzene, and 43 grams of 4,4'-dinitrobibenzyl (32 percent yield) and 4 grams of 4,4'-dinitrostilbene (3 percent yield) were isolated.

*Example 8*

A mixture of para-nitrotoluene (137 grams) and 33 percent methanolic potassium hydroxide (400 grams) was oxidized with oxygen for four hours at a temperature of 7° C. to 30° C. A crude product (72 grams, 53 percent yield) was recovered. The production ratio was 36 grams per liter per hour. The crude product was treated with benzene and 64 grams of 4,4'-dinitrobibenzyl (47 percent yield) and 3 grams of 4,4'-dinitrostilbene (2 percent yield) were isolated.

*Example 9*

A solution of 137 grams of para-nitrotoluene in 300 grams of pyridine was fed in 1 hour to 400 grams of 33 percent methanolic potassium hydroxide while stirring at 5–10° C. and passing excess oxygen through the mixture. After the oxidation was continued for 0.8 hour at a temperature of 5° C. to 10° C., the crude product (107 grams, 79 percent yield) was recovered. The production ratio was 77 grams per liter per hour. The crude product was treated with benzene and 86 grams of 4,4'-dinitrobibenzyl (63 percent yield) and 12 grams of 4,4'-dinitrostilbene (9 percent yield) were isolated.

*Example 10*

This example illustrates the oxidative coupling of para-nitrotoluene performed in a solvent which does not satisfy all the limitations required of the solvents of this invention.

A solution of 137 grams of para-nitrotoluene in 460 grams of 2-methyl-5-ethylpyridine was fed in 1 hour to 400 grams of 33 percent methanolic potassium hydroxide while passing oxygen through the mixture at 5–10° C. After the oxidation was continued for 2.3 hours at a temperature of 10° C. to 15° C., the crude product (45 grams, 33 percent yield) was recovered. The production ratio was 14 grams per liter per hour. The crude product was treated with hot benzene, and 14 grams of 4,4'-dinitrobibenzyl (10 percent yield) and 28 grams of 4,4'-dinitrostilbene (21 percent yield) were isolated.

*Example 11*

A solution of 137 grams of para-nitrotoluene in 484 grams of triethylamine was fed in 1 hour to 400 grams of 33 percent methanolic potassium hydroxide while passing oxygen through the mixture at 5–10° C. After the oxidation was continued for 0.8 hour at a temperature of 5° C. to 10° C., the crude product (29 grams, 21 percent yield) was recovered. The production ratio was only 14 grams per liter per hour. The crude product was treated with hot benzene, and 20 grams of 4,4'-dinitrobibenzyl (15 percent yield) was isolated.

*Example 12*

A solution of 137 grams of para-nitrotoluene in 300 grams of diethylene glycol diethyl ether was fed in 1 hour to 400 grams of 33 percent methanolic potassium hydroxide while passing oxygen through the mixture at 5–10° C. After the oxidation was continued for 1.5 hours at a temperature of 5° C. to 10° C., the crude product (86 grams, 63 percent yield) was recovered. The production ratio was 42 grams per liter per hour. The crude product was treated with hot benzene, and 57 grams of 4,4'-dinitrobibenzyl (42 percent yield) and 23 grams of 4,4'-dinitrostilbene (17 percent yield) were recovered.

*Example 13*

A solution of 137 grams of para-nitrotoluene in 300 grams of dioxane was fed in 1 hour to 400 grams of 33 percent methanolic potassium hydroxide while passing oxygen through the stirred mixture at 5–10° C. After the oxidation was continued for two hours at a temperature of 5° C. to 10° C., the crude product (70 grams, 52 percent yield) was recovered. The production ratio was 30 grams per liter per hour. The crude product was treated with hot benzene and 55 grams of 4,4'-dinitrobibenzyl (40 percent yield) and 5 grams of 4,4'-dinitrostilbene (4 percent yield) were isolated.

*Example 14*

This example illustrates the oxidative coupling of para-nitrotoluene performed with methanol as a solvent medium.

A solution of 137 grams of para-nitrotoluene in 300 grams of methanol was fed in one hour to 400 grams of 33 percent methanolic potassium hydroxide while passing oxygen through the stirred mixture at 5–10° C. After the oxidation was continued for one hour at a temperature of 5° C. to 10° C., the total crude product recovered weighed less than one gram.

*Example 15*

This example illustrates the oxidative coupling of para-nitrotoluene performed with diethylene glycol monoethyl ether as a solvent medium.

A solution of 137 grams of para-nitrotoluene in 300 grams of diethylene glycol monoethyl ether was fed in 1 hour to 400 grams of 33 percent methanolic potassium hydroxide while passing oxygen through the stirred mixture at 5–10° C. After the oxidation was continued for one hour at a temperature of 5° C. to 10° C., the total crude product recovered weighed only 3 grams. This corresponded to a yield of 2 percent.

*Example 16*

A solution of 137 grams of para-nitrotoluene in 300 grams of 98 percent ethylenediamine was fed in one hour to a suspension of finely-divided 85 percent potassium hydroxide (125 grams) in 600 grams of ethyl ether while passing oxygen through the stirred mixture at 5–10° C. After the oxidation was continued for one hour at a temperature of 5° C. to 10° C., the crude product (85 grams, 63 percent yield) was recovered. The production ratio was 31 grams per liter per hour. The crude product was treated with hot benzene and 10 grams of 4,4'-dinitrobibenzyl (7 percent yield) and 63 grams of 4,4'-dinitrostilbene (47 percent yield) were recovered.

*Example 17*

A solution of 137 grams of para-nitrotoluene in 294 grams of pyridine was fed in one hour to a solution of 54 grams of sodium methoxide in 156 grams of methanol while passing oxygen through the stirred mixture at 5–10° C. After the oxidation was continued for 1.5 hours at a temperature of 10° C. to 20° C., the crude product (38 grams, 28 percent yield) was recovered. The production ratio was 23 grams per liter per hour.

*Example 18*

A solution of 137 grams of para-nitrotoluene in 800 grams of pyridine was fed in one hour to 172 grams of 28 percent methanolic Triton B * while passing oxygen through the stirred mixture at 5–10° C. After the oxidation was continued for 1.8 hours at a temperature of 5° C. to 10° C., the crude product (21 grams, 15 percent yield) was recovered. The production ratio was 12 grams per liter per hour. The crude product was treated with hot benzene, and 19 grams of 4,4'-dinitrobibenzyl (14 percent yield) was isolated.

*Example 19*

A solution 137 grams of ortho-nitrotoluene in 300 grams of 98 percent ethylenediamine was fed in 1 hour to 400 grams of 33 percent methanolic potassium hydroxide while passing oxygen into the mixture at 5–10° C. After the oxidation was continued for 0.8 hour at a temperature of 5° C. to 10° C., the crude product was precipitated with water and filtered. After washing with ethanol and drying, the 2,2'-dinitrobibenzyl (49 grams, 36 percent yield) had a melting point of 119.5–120.5° C. The production ratio was 34 grams per liter per hour.

What is claimed is:

1. In an oxidative method for coupling para-nitrotoluene to form 4,4'-dinitrobibenzyl, the steps which comprise treating para-nitrotoluene with oxygen in the presence of between 0.005 part and 3.0 parts by weight of an alkali metal hydroxide, between 0.1 part and 10 parts by weight of methanol, between 1 and 20 parts by weight of an organic solvent selected from the group consisting of amines and ethers having a molecular weight between about 60 and 200 and having a solubility of between 6 and 100 percent by weight in water at a temperature of 20° C., per part by weight of said para-nitrotoluene, at a reaction temperature of between −10° C. and 50° C.

2. The method of claim 1 wherein said alkali metal hydroxide is potassium hydroxide.

3. The method of claim 1 wherein said alkali metal hydroxide is sodium hydroxide.

4. The method of claim 2 wherein said organic solvent is ethylenediamine.

5. The method of claim 2 wherein said organic solvent is pyridine.

6. The method of claim 2 wherein said organic solvent is diethyl ether of diethylene glycol.

7. The method of claim 2 wherein said organic solvent is dioxane.

8. In an oxidative method for coupling para-nitrotoluene to form 4,4'-dinitrobibenzyl, the improvement which comprises treating para-nitrotoluene with oxygen in the presence of between 0.005 part and 3.0 parts by weight of sodium hydroxide, between 0.1 part and 10 parts by weight of methanol and between 1 and 20 parts by weight of ethylenediamine per part by weight of said para-nitrotluene, at a reaction temperature between −10° C. and 50° C.

References Cited in the file of this patent

Green et al.: "J. Chem. Soc.," 91, 2076–79 (1907).
Tsuruta et al.: "Bull. Inst. Chem. Research," Kyto Univ., vol. 30, 46–8 (1952).
Fuson et al.: "J.A.C.S.," 75, 1325–27 (1953).

* Benzyltrimethylammonium hydroxide.